Nov. 16, 1926.
B. T. GUEST
1,607,530
SUGAR DISPENSING DEVICE
Filed July 22, 1924
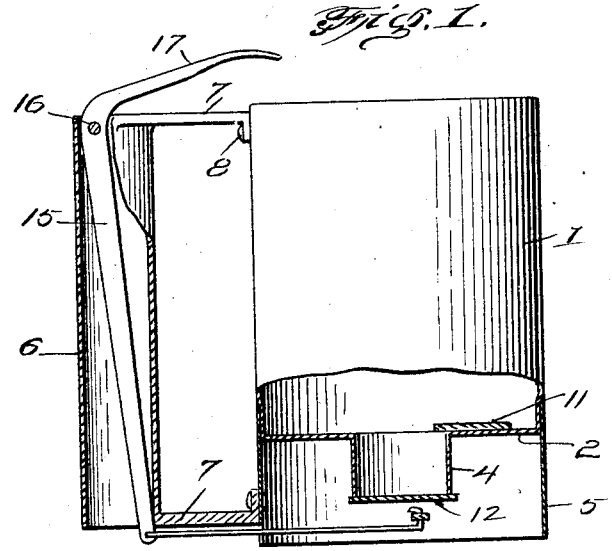
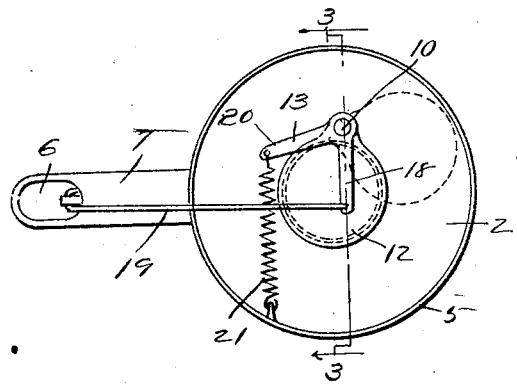
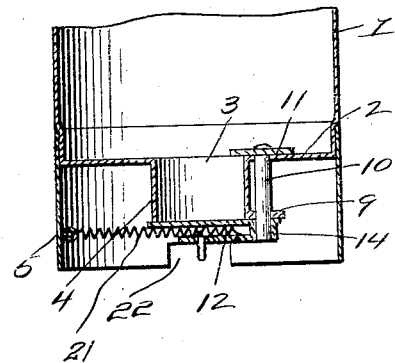
Inventor
B. T. Guest.
By Clarence A. O'Brien
Attorney Patented Nov. 16, 1926.

1,607,530

UNITED STATES PATENT OFFICE.

BENJAMIN T. GUEST, OF STERLING CITY, TEXAS.

SUGAR-DISPENSING DEVICE.

Application filed July 22, 1924. Serial No. 727,458.

This invention relates to new and useful improvements in sugar dispensing devices and has for its principal object to provide a simple and efficient device whereby a predetermined quantity of sugar may be dispensed at one time, thereby preventing any unnecessary loss or waste.

Another important object of the invention is to provide a sugar dispensing device of the above mentioned character, which will at all times be positive and efficient in its operation, means being provided for normally holding the closure for the outlet end of the charge receiving chamber in engagement therewith, means being further provided for cutting off the supply to the chamber when the contents of the chamber is being discharged therefrom.

A further object of the invention is to provide a sugar dispensing device of the above mentioned character, which is simple in construction, inexpensive, strong and durable and furthermore adapted for the purposes for which it is designated.
Other obpects and advantages of this invention will become apparent during the course of the following description.

In the accompanying drawing forming a part of this specification and in which like numerals designate like parts throughout the same:

Figure 1 is a view partly in side elevation and partly in section of my improved sugar dispensing device.
Figure 2 is a bottom plan view thereof, and Figure 3 is a sectional view taken approximately on line 3—3 of Figure 2.

In the drawing wherein for the purpose of illustration is shown the preferred embodiment of my invention, the numeral 1 designates a sugar receptacle which is substantially cylindrical and the same is provided with the bottom 2. The bottom is provided with an opening 3 which is arranged centrally therein and extending downwardly from the bottom around the opening is the tubular extension 4 the same providing a discharge spout and a charge receiving chamber. In order that the receptacle may be supported in upright position when placed on a flat surface such as a table or the like, I provide the supporting ring 5 which extends around the lower portion of the casing in the manner more clearly illustrated in Figures 1 and 3 of the drawing. The ring 5 is of such height as to space the lower edge of the tubular extension from the bottom edge of the ring as is also clearly illustrated in the drawing.

Associated with the casing 1 is the tubular handle 6 and the same is spaced from the casing through the medium of the laterally extending supporting bracket 7. Any suitable fastening means such as is shown at 8 may be provided for securing the bracket through the casing.

The tubular extension 4 is provided with the lateral extension 9 at the lower edge thereof and the purpose of this extension is to provide a means for supporting the vertical pin 10 which extends through the extension 9 and the bottom 2 of the receptacle or casing in the manner as illustrated in Figure 3. The pin 10 is adapted for rotary movement in its support and carries on its upper end the plate 11 which provides a closure or gate for the opening 3 which forms an inlet opening for the charge receiving chamber 4. The lower end of the pin 10 carries thereon a similar plate 12 and the plate 12 provides a closure for the outlet end of the charge receiving chamber or discharge spout 4. The plates are so arranged on the pin 9 as to have the plate 11 out of engagement with the inlet opening 3 when the plate 12 is in engagement with the outlet end of the charge receiving chamber or discharge spout 4 in the manner clearly illustrated in Figures 1 and 3 of the drawing. This is the normal position of the plate and will thereby enable the charge receiving chamber to be filled with sugar which is contained within the receptacle or casing 1.

In order that the sugar within the compartment or chamber provided by the tubular extension 4 may be dispensed therefrom, I provide the lower end of the pin 10 with the substantially V-shaped lever 13, the apex of which is secured to the lower end of the pin 10 in the manner as illustrated at 14 in the drawing. An operating lever 15 extends longitudinally through the handle 6 and is pivoted as at 16 in the upper portion thereof and terminates in its upper end in the lateral extension 17 which forms a handle for the lever. The lower end of the lever 15 extends below the lower end of the tubular handle 6 of the receptacle 1 and is connected to one of the arms 18 of the V-shaped lever 13 by means of the rod or link 19. The other arm 20 of the substantially V-shaped lever 13 is connected at its free end to one end of a suitable coil spring 21, said spring being fastened to the inner wall of the ring 5. It is of course to be understood that the ring 5 is provided with a cut out portion such as is illustrated at 22 in order to permit the passage therethrough of the wire rods 19.

Normally the parts are arranged as shown in the drawing and the container or receptacle 1 is filled with sugar from the top, it being understood of course that a suitable cover is placed over the top of the casing. The discharge spout 4 will then be automatically filled and will contain a predetermined quantity of sugar which in most cases will be the equivalent of a teaspoonful. When a person desires to obtain a teaspoonful of sugar, the handle 17 is depressed causing the lever 15 to actuate the lever 13 against the tension of the coil spring 21. Simultaneously the pin 10 is rotated whereby the plate 11 will be brought into engagement with the inlet end of the tubular extension which forms a charge receiving chamber. Simultaneously the plate 12 is moved out of engagement with the outlet end so that the sugar within the spout 4 may be discharged therefrom into the receptacle which is to receive the predetermined charge of sugar. It is to be understood of course that the receptacle 1 is held over the cup or the like by the handle 6 when dispensing the sugar therefrom. The positioning of the plate 11 over the inlet end of the chamber 4 will automatically cut off a further supply of sugar thereto and after all of the sugar has been dispensed from the spout, the lever 17 is released and the coil spring 21 will return the plates 11 and 12 to their normal positions whereby the chamber 4 may again be automatically filled.

The provision of a sugar dispensing device of the above mentioned character enables the same to be readily and easily operated and will at all times be positive and efficient in its operation for dispensing predetermined quantities of sugar at one time. Furthermore a sugar dispensing device of the above mentioned character, will be sanitary and may be used in restaurants, lunch rooms and other similar places and will furthermore prevent the unnecessary loss and waste of sugar which results from the manner in which sugar is now universally dispensed.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A sugar dispensing device comprising a casing, a tubular handle associated therewith, a discharge spout extending from the bottom of the casing and providing a charge receiving chamber for receiving a predetermined quantity of sugar, a pair of cooperating plates associated with the inlet and outlet ends respectively of the discharge spout, the plate for the inlet end of the spout being normally out of engagement therewith, the plate for the outlet end being normally in engagement therewith, an actuating lever extending through said handle and pivotally supported at its upper end therein, the upper end terminating in a lateral extension providing a handle for the lever, connecting means between the lower end of the lever and said plates whereby the latter are operated upon the actuation of the handle for the lever to close the inlet of the spout and simultaneously opening the outlet end thereof to dispense the charge within the spout, and means for returning the plates to their normal positions.

In testimony whereof I affix my signature.

BENJAMIN T. GUEST.